Nov. 3, 1942.     B. LONG     2,301,062
ARTICLE MADE OF SPONGE GLASS AND METHOD OF MANUFACTURING THE SAME
Filed April 4, 1939
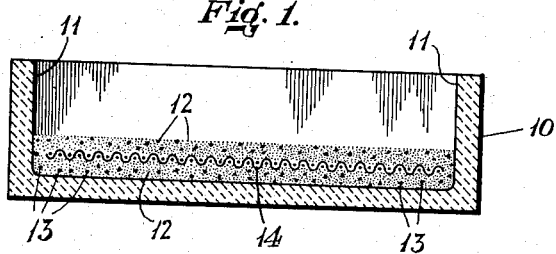
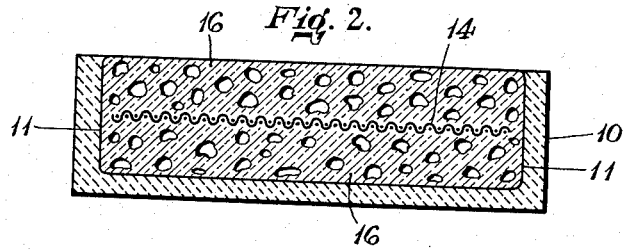
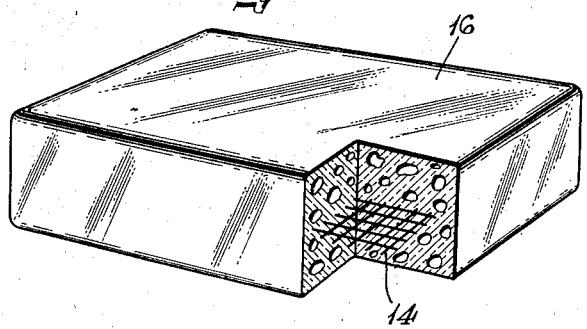
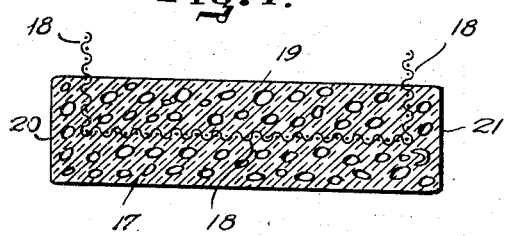
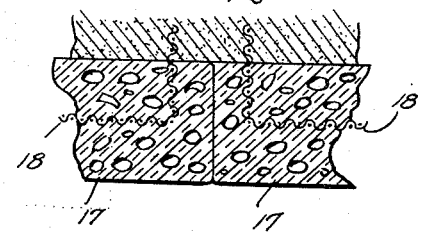
INVENTOR.
BERNARD LONG
BY
ATTORNEYS Patented Nov. 3, 1942

2,301,062

UNITED STATES PATENT OFFICE 2,301,062

ARTICLE MADE OF SPONGE GLASS AND METHOD OF MANUFACTURING THE SAME

Bernard Long, Paris, France, assignor to Societe Anonyme des Manufactures des Glaces & Produits Chimiques de Saint-Gobain, Chauny & Cirey, Paris, France, a corporation of France Application April 4, 1939, Serial No. 265,886
In France April 14, 1938

4 Claims. (Cl. 72—40)

This invention refers to bricks or other articles used particularly for construction purposes and consisting of multicellular or sponge glass, having a low apparent density and provided with a large number of inner cells or cavities which may be completely empty or filled with a gas.

Bricks or other construction elements consisting of multicellular or sponge glass are excellent heat and sound insulators. However, the products known heretofore are comparatively easily breakable, particularly since the inner walls extending between the cells are often very thin. There may be other reasons for the fragility of sponge glass elements, such as the fact that it is difficult to anneal them uniformly.

An object of the present invention is the provision of a new article consisting of multicellular glass which is of sturdy structure and not liable to break easily and which will easily withstand the forces exerted upon it. This new article may be used for various purposes and particularly as a construction element.

Other objects of the present invention will appear in the course of the following specification.

The object of the present invention may be realized through the provision of an article, for example a construction element, consisting of multicellular glass and containing one or more armatures or reinforcing pieces embedded within the mass of the multicellular glass, each of these armatures or strengthening pieces being so disposed and/or formed that it enables the construction element to resist successfully the various types of forces exerted upon the element.

The armature embedded in the multicellular or sponge glass may consist of metal and may have, for example, the form of an ordinary wire mesh or net capable of withstanding traction forces, or a wire mesh of the type known as "expanded metal." However, many other substances may also be advantageously employed. For example, the armatures or reinforcing pieces may consist of fibres or threads of glass or asbestos which may be woven or braided to form a net.

The present invention has also for its object the method for the manufacture of a reinforced multicellular glass element.

According to one mode of carrying out the method according to the present invention, a layer of the material used for the production of the multicellular glass which is capable of swelling under the action of heat and/or depression is placed in a mould. The reinforcing element, constituted for example by a wire mesh, is disposed on this layer before the swelling of said material and in such a manner that it is supported by this layer and free to move vertically with respect to the mould and to follow the displacement of the upper surface of this layer during the swelling of the material. The reinforcing element is then covered by a second layer of the material used for the manufacture of multicellular glass and the whole is subjected to the treatment necessary to cause the swelling of the material and produce multicellular glass.

The ratio between the thicknesses of the two layers of multicellular glass on each side of the reinforcing element in the finished product is determined by the ratio of the thicknesses of the two layers of the material on each side of the reinforcing element before the swelling. Consequently the position of the reinforcing element in the finished multicellular glass element is determined by the thicknesses of the two layers of the material placed in the mould before the swelling.

An advantage of this mode of realization of the invention is that the material during its swelling is not compelled to pass through the reinforcing element, for example wire mesh, as it would be the case if the reinforcing element were maintained in a fixed position with respect to the mould. In this latter case the reinforcing element would constitute an obstacle to the swelling of the material.

The method according to the present invention may be carried out advantageously by using as the material to produce the multicellular glass, a pulverized mixture of comminuted glass particles and particles of substances capable of developing gases or vapors at the temperature at which the glass particles become soft and capable of being soldered by mere contact one with the other.

However any other material to produce multicellular glass may be used to produce a reinforced multicellular glass element according to the invention.

The invention will appear more clearly from the following detailed description when taken in connection with the accompanying drawing, showing by way of example preferred embodiments of the inventive idea.

In the drawing:

Figures 1 and 2 are cross-sections through a mold and illustrate the process of manufacturing construction elements in accordance with the present invention, Figure 1 showing the initial stage of the process, while Figure 2 shows its final stage.

Figure 3 is a perspective view of a completed construction element with a part broken off.

Figure 4 is a section through a construction element of a somewhat different type.

Figure 5 is a section through portions of two construction elements.

The mold 10 shown in Figures 1 and 2 has inner walls 11 corresponding in size to those of the finished construction piece. In order to manufacture a multicellular glass, a pulverized mixture of comminuted glass particles 12 and particles 13 of substances capable of developing gases or vapors at the temperature at which the glass particles are capable of being soldered one to the other, i. e., a temperature of about 800° C. to 900° C. is deposited on the bottom of the mold 10. Then the reinforcing piece 14 constituted for example by a wire mesh or net, is placed upon this layer, which consists of a uniform mixture of the substances 12-13 and is covered by a second layer which also consists of a uniform mixture of the same substances.

Thereupon, the mold and its content are heated to a temperature of about 800° C. to 900° C. preferably, in a furnace of the usual type; the substances swell and at the same time the glass particles are joined one with the other until finally the brick 16 made of multicellular glass is formed. The reinforcing element 14 is situated substantially in the middle of the finished brick 16.

In most instances, this is the preferred position of the reinforcing element 14 within the brick 16.

In certain instances, it may be preferred that the reinforcing element be located closer to one or to the other of the outer surfaces of the brick. This may be easily accomplished by placing the reinforcing element 14 within the mixture 12 in the mold 10 at a suitable distance from the bottom of that mold, prior to the heating operation.

In some instances, it may be advisable to place the reinforcing mesh or net 14 on top of the mixture 12 of comminuted glass and gas-developing substances. Then these substances in the course of the swelling rise over the reinforcing mesh or net 14 and cover it.

Figure 4 shows a construction brick 17 consisting of multicellular glass and having a reinforcing wire mesh or net 18 which projects out of the construction element. The brick was manufactured in accordance with the described process; however, the net or mesh 18 originally was placed in such manner within the mould in relation to the comminuted mixture that after the completion of the brick 17 the mesh 18 still has two ends which emerge out of the surface 19 of the brick. When a number of bricks 17 is assembled for construction purposes, for example, when the bricks are arranged to form the lining of a ceiling, their surfaces 20 and 21 engage each other. The projecting ends of the strengthening element 18 emerge out of the wider surface of the brick, so that they will not interfere with the placing of the bricks and can be used conveniently for the purpose of firmly attaching the bricks to their structural supports.

In certain instances, the reinforcing net 18 or any other strengthening element enclosed in a multicellular glass brick may extend at right angles to the larger main surfaces 19 of the brick 17 instead of extending parallel to these surfaces.

It may be also advantageous to place the strengthening pieces adjacent the angles of the elements or in zones close to the borders thereof. The reinforcing of such zones may be carried out in addition to the reinforcing of the element as a whole and it is possible to provide several strengthening pieces or net portions in various zones or sections of a single brick.

Whenever a net of woven or braided threads consisting of glass or asbestos fibres is used as an armature for the purpose of strengthening sponge glass, it is necessary that the swelling of sponge glass takes place at a temperature which is sufficiently low to prevent the destruction of the armature.

Obviously, the present invention is applicable to all articles made of multicellular glass, irrespective of their manner of manufacture.

Articles manufactured in accordance with the present invention present several advantages, as compared to prior art.

Due to the provision of the reinforcing pieces, the annealing of multicellular glass is considerably facilitated. The supervision of this operation is rendered much more simple and easy and the output is considerably increased.

Elements made of reinforced multicellular or sponge glass are much stronger than those which are not reinforced, as far as their utilization for construction purposes is concerned. The armatures of these elements may project outside of the elements when the latter are used for wall structure and the like, and may be covered by cement, plaster, or other substances used for connecting the elements one with the other, as illustrated in Figure 5 of the drawing.

Another advantage of articles manufactured in accordance with the present invention is that the use of reinforcing pieces which are embedded in construction elements made of multicellular glass, makes it possible to provide a structure having a great resistance and a high rigidity.

In other words, the provision of reinforcing pieces serves two purposes: In the first place, the reinforcing pieces make it possible to provide elements made of multicellular or sponge glass which individually have a much greater resistance than elements used heretofore. In the second place, elements manufactured in accordance with the present invention may be used directly for the purpose of providing structural assemblies, the component parts of which are connected one with the other in a systematic manner, thus furthering the resistibility of the structure as a whole.

The present invention is applicable to all types of construction elements made of multicellular or sponge glass, such as slabs, blocks, molded decorative elements, panels, ceiling pieces, etc. The elements need not be used solely for architectural purposes, for example, cylindrical shells consisting of reinforced multicellular or sponge glass may form parts of a canalisation piping. Sponge or multicellular glass articles manufactured in accordance with the present invention may be also used for a variety of entirely different purposes, for example, as floats for fishing nets.

It should be noted that the reinforcing pieces, while increasing the cohesion of the sponge glass parts, have the further advantage of maintaining in place fragments of sponge glass in case of breakage.

It is apparent that the specific illustrations shown above have been given by way of illustration and not by way of limitation, and that the structures above described are subject to wide variation and modification without departing from the scope or intent of the invention. The structure, the composition, the arrangement, the number, and the direction of the reinforcing pieces immersed in the mass of sponge glass may vary according to the purpose, the form or any other characteristics of a specific element, in order to obtain in each case the greatest possible reinforcement of zones subjected to the greatest strains, or affording the greatest danger to the preservation of the construction element.

What is claimed is:

1. An article of manufacture, comprising, in combination, a multicellular or sponge glass body, and at least one reinforcing element situated within said multicellular glass body.

2. An article of manufacture, comprising, in combination, a multicellular or sponge glass body, and at least one wire mesh situated within said multicellular glass body.

3. An article of manufacture, comprising, in combination, a multicellular glass body, and at least one armature situated within said multicellular glass body, and having at least one end portion projecting outside of said multicellular glass body.

4. A building structure, comprising, in combination, a plurality of interconnected structural elements, each of said structural elements comprising a multicellular glass body, and at least one armature situated within said multicellular glass body.

BERNARD LONG.